UNITED STATES PATENT OFFICE.

CHARLES H. WILDER, OF NATICK, MASSACHUSETTS, ASSIGNOR TO THE HUB CARBON COMPANY, OF KENNEBUNK, MAINE.

CARBON ELECTRODE FOR GALVANIC BATTERIES.

SPECIFICATION forming part of Letters Patent No. 375,034, dated December 20, 1887.

Application filed February 17, 1887. Serial No. 228,013. (No specimens.)

*To all whom it may concern:*

Be it known that I, CHARLES HENRY WILDER, of Natick, in the county of Middlesex and Commonwealth of Massachusetts, have invented a new and useful Improvement in Carbons for Electrical Purposes, of which the following is a specification.

My invention relates to the carbon electrodes for electrical purposes, the object of it being to provide a carbon element for a galvanic battery in any form or size, which will be constituted, when finished, of pure carbon without any admixture of other substances or material whatever; and it consists of the preparation of coke, the molding it into required form, baking, and cooling, as described below.

Formed pieces of carbon for electrical purposes have heretofore been made by mixing coke-powder in melted sugar or molasses and molding and baking the mixture. The product of this mixture of mineral carbon and vegetable carbonaceous substances when baked has been fragile and brittle with so little cohesive strength that the greatest care is necessary to get the pieces, if hollow, out of the mold, and it has been impossible to make hollow pieces of any considerable size, and the size that could be made required the most careful handling, and such pieces do not have the electric generating and conducting quality in such degree as desirable, owing to the fact that the carbonaceous nature of the saccharine portion of the mixture was not such as would produce by heating and charring a coke like or similar to the coke produced by heating and charring mineral carbonaceous fluid, as coal-tar and bitumen or mineral pitch. Consequently a carbon piece made from coke and sugar or molasses mixed is not homogeneous in its structure, that portion of the mass which was the coke being of one quality, and that portion which was the saccharine matter of another and very different quality, the mass lacking strength, porosity, and electric generating and conducting qualities.

Requiring cylindrical carbon pieces of considerable size, (six to eight inches in diameter and of that length and of the highest electrical quality,) and being unable to find such on the market, I began an experimental labor which finally resulted in the invention herein set forth.

To practice my invention I select from coke from gas-making pieces which are free from slate, shale, stone, earthy matter, mineral and metallic oxides, which I reduce to a fine powder by grinding or any other suitable means. I then melt together and thoroughly mix in a fluid state about two parts of bitumen—such as is commonly known as roofers' pitch—and one part of coal-tar from gas-works. With this in a heated state, I mix the powdered coke, also hot, until it is of the consistency of stiff mortar. This I form in molds, into which I force it by pressure or ramming, the density and porosity of the formed carbon being regulated by the amount of pressure or ramming applied to it in the mold. After the mold is filled it is placed in a tightly-closed furnace or oven and subjected to heat of 2,000° to 2,500° Fahrenheit for two to three hours, by which the bitumen and tar used in mixing the coke is thoroughly coked, making the whole mass of the formed carbon homogeneous. When the baking or coking is complete, the mold, with the formed carbon in it, is withdrawn from the furnace and buried deep in sand or ashes, where it is left until it is cooled, when the formed carbon is removed from the mold ready for use. By this method hollow cylindrical pieces of formed carbon may be made of a size as large as could be handled, having all the desired strength to sustain many times its own weight and resist severe blows and strains.

Carbons for electric purposes may in this manner be made to have any desired form and any desired degree of density or porousness. They can be made much cheaper than formed carbons have been made heretofore, and their usefulness and efficiency for electrical purposes is much greater than those heretofore made.

The test in practical use in batteries of cylindrical pieces of carbon made in the manner described, of six to eight inches in diameter and about that length, for six months fully justifies all here said of the practical superiority of such.

I claim as new and my invention—

A carbon electrode for batteries, consisting of particles of ground coke integrally united by coal-tar and bitumen coked in the body of the electrodes, substantially as set forth.

CHARLES H. WILDER.

Witnesses:
CHS. HOUGHTON,
F. L. HOUGHTON.